United States Patent
Ramanujam (10) Patent No.: US 11,939,947 B2
(45) Date of Patent: Mar. 26, 2024

(54) METHOD OF SHAPING AN EDGE SEAL FOR A ROTOR BLADE ADD-ON

(71) Applicant: Siemens Gamesa Renewable Energy A/S, Brande (DK)

(72) Inventor: Giridhar Ramanujam, Brande (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 104 days.

(21) Appl. No.: 17/435,842

(22) PCT Filed: Mar. 9, 2020

(86) PCT No.: PCT/EP2020/056258
§ 371 (c)(1),
(2) Date: Sep. 2, 2021

(87) PCT Pub. No.: WO2020/182762
PCT Pub. Date: Sep. 17, 2020

(65) Prior Publication Data
US 2022/0154685 A1    May 19, 2022

(30) Foreign Application Priority Data

Mar. 8, 2019  (EP) ..................................... 19161709
Aug. 1, 2019  (EP) ..................................... 19189612

(51) Int. Cl.
*F03D 1/06*    (2006.01)

(52) U.S. Cl.
CPC ........ *F03D 1/0675* (2013.01); *F05B 2230/10* (2013.01); *F05B 2230/31* (2013.01);
(Continued)

(58) Field of Classification Search
CPC .. F03D 1/0675; F03D 1/0683; F05B 2230/10; F05B 2230/31; F05B 2230/90;
(Continued)

(56) References Cited

U.S. PATENT DOCUMENTS

| | | | | |
|---|---|---|---|---|
| 4,895,491 A | * | 1/1990 | Cross | F04D 29/388 29/889.7 |
| 2009/0087314 A1 | * | 4/2009 | Haag | F03D 1/0675 416/223 R |

(Continued)

FOREIGN PATENT DOCUMENTS

| | | |
|---|---|---|
| CA | 3022898 | 3/2018 |
| CN | 102619676 A | 8/2012 |

(Continued)

OTHER PUBLICATIONS

International Search Report & Written Opinion dated Jul. 6, 2020 for PCT/EP2020/056258.

*Primary Examiner* — Aaron R Eastman
(74) *Attorney, Agent, or Firm* — Schmeiser, Olsen & Watts LLP (57) ABSTRACT

Provided is a method of shaping an initial edge seal along a longitudinal edge step of an add-on part mounted on the outer surface of a rotor blade, which method includes the steps of providing an initial edge seal along a longitudinal edge step of an add-on part mounted on an outer surface of a rotor blade, and removing a top layer of the initial edge seal. Further provided is wind turbine rotor blade.

15 Claims, 2 Drawing Sheets

(52) U.S. Cl.
CPC ..... *F05B 2230/90* (2013.01); *F05B 2240/303* (2020.08); *F05B 2250/62* (2013.01)

(58) Field of Classification Search
CPC ............ F05B 2240/303; F05B 2250/62; F05B 2240/305; F05B 2240/3062; F05B 2230/30; F05B 2240/57; Y02E 10/72; Y02P 70/50
See application file for complete search history.

(56) References Cited

U.S. PATENT DOCUMENTS

| | | | | |
|---|---|---|---|---|
| 2010/0028160 | A1* | 2/2010 | Schaeffer | F04D 29/324 29/889.71 |
| 2011/0243751 | A1 | 10/2011 | Fritz et al. | |
| 2013/0108457 | A1* | 5/2013 | Thrue | F03D 1/0641 29/889.21 |
| 2014/0328687 | A1* | 11/2014 | Tobin | F03D 1/0633 416/174 |
| 2016/0046088 | A1* | 2/2016 | Haag | F03D 80/55 427/535 |
| 2017/0016426 | A1 | 1/2017 | Kuhn | |
| 2019/0195202 | A1* | 6/2019 | Kirkegaard | B29C 65/485 |
| 2021/0324829 | A1* | 10/2021 | Ramanujam | B29C 65/52 |
| 2022/0258430 | A1* | 8/2022 | Kimiaeifar | B29C 66/71 |

FOREIGN PATENT DOCUMENTS

| | | |
|---|---|---|
| CN | 103890382 A | 6/2014 |
| CN | 108661852 A | 10/2018 |
| CN | 109268203 A | 1/2019 |
| EP | 2927482 A1 | 10/2015 |
| EP | 3 144 525 A1 | 3/2017 |
| EP | 3 620 648 A1 | 3/2020 |
| JP | 2006098182 A | 4/2006 |
| WO | 2014/198354 A1 | 12/2014 |
| WO | 2018/051153 A1 | 3/2018 |

* cited by examiner

METHOD OF SHAPING AN EDGE SEAL FOR A ROTOR BLADE ADD-ON

CROSS-REFERENCE TO RELATED APPLICATIONS

This application claims priority to PCT Application No. PCT/EP2020/056258, having a filing date of Mar. 9, 2020, which is based on EP Application No. 19189612.5, having a filing date of Aug. 1, 2019, and EP Application No. 19161709.1, having a filing date of Mar. 8, 2019, the entire contents all of which are hereby incorporated by reference.

FIELD OF TECHNOLOGY

The following describes a method of shaping an edge seal for a rotor blade add-on. Especially, the following describes a method for aerodynamic edge finishing for steps on the surface of wind turbine blades.

BACKGROUND

The aerodynamic performance of wind turbine rotor blades is highly sensitive to surface imperfections, especially to those that lie in close proximity to the leading edge of the rotor blade. This presents a challenge when a step or an obstacle is present on the rotor blade surface, for example following the application of a leading edge protection (LEP) cover and/or a vortex generator (VG) panel, a trailing edge (TE) panel, etc. LEP covers are also referred to as erosion protective covers or LEP shells.

A sharp step may be present at the edges of a panel or cover attached to the rotor blade. Such an abrupt height difference causes the air flow to transition from laminar to turbulent, which will adversely impact the annual energy production (AEP) of the wind turbine and may also contribute to wind turbine noise.

Steps due LEP or other add-ons are especially an issue for more intrusive solutions, like e.g., the products SGRE Power Edge®, Polytech ELLE®, the 3M® Wind Protection Tape or others.

One way of reducing turbulence arising from a step along the edge of an add-on is to provide an edge seal along a longitudinal edge of an add-on part mounted on the outer surface of a rotor blade. A respective method comprises the steps of determining a height at the longitudinal edge of the add-on part, choosing a width for the edge seal to be applied onto the surface of the rotor blade, wherein the edge seal width is chosen to exceed the height at the longitudinal edge of the add-on part by a factor of at least twenty (i.e., the ratio of rotor blade edge seal width to add-on height is at least 20:1) and forming the edge seal by applying a sealant material at least in a volume defined by the height at the longitudinal edge of the add-on part and the determined blade surface edge seal width.

Advantageously, such edge seal reduces the negative impact of steps or other obstacles on the aerodynamic performance of a rotor blade. By significantly reducing or even eliminating the negative influence of the abrupt edges of an add-on on the rotor blade aerodynamic performance, the inventive edge seal can ensure that an add-on is "AEP-neutral". This sealing also makes it possible to implement add-ons such as LEP shells, LEP covers etc., with a higher edge thickness. Generally, edge sealing contributes to the aerodynamic performance improvement of the LEP solution.

However, until today edge sealing is not optimized. There might still remain a step between add-on and edge seal due to shrinking of the sealing material or manufacturing imperfections during forming the sealing material. Furthermore, depending on the manufacturing method, the sealing material may lead to disadvantageous effects, e.g., due to partly loosening from the add-on.

SUMMARY

An aspect relates to a way of optimizing an edge seal between a surface of a rotor blade and an add-on and improving the aerodynamic performance of a rotor blade.

Embodiments of the invention describe a method of shaping an edge seal along a longitudinal edge of an add-on part mounted on the outer surface of a rotor blade, i.e., for aerodynamic edge finishing for steps on the surface of wind turbine blades. The presented solution can e.g., be based on a soft shell of finite thickness being applied on the leading edge, but the general idea applies to any kind of step on the surface of a wind turbine blade. The inventive method comprises the following steps.

Providing an initial edge seal along a longitudinal edge step of an add-on part mounted on an outer surface of a rotor blade, the initial edge seal is overlapping with the add-on part. The initial edge seal may be provided in that it is already existent on a rotor blade, however, it is desired that it is provided by applying a sealant on a rotor blade, forming an edge seal and hardening or curing the sealant. The expression "initial" should indicate that the edge seal is yet not optimized by embodiments of the present invention.

Removing a top layer of the initial edge seal. This can be done by a machining step, especially by grinding, sanding, milling or cutting. The top layer should be removed in a way that the resulting edge seal forms a wedge with straight or curved lines forming a transition from the edge of the add-on until the transition to the rotor blade, especially without any step.

Embodiments of the invention comprise (or consists of) a sealing step and a grinding step. By example, a leading-edge shell or tape, both sides or either one of the protective cover can be subjected to the edge treatment as propose herein. Similar other add-ons placed on a blade, i.e., placed on a leading and/or trailing edge and pressure and/or suction side, wherein an edge/edges occur can likewise be subjected to the edge treatment as proposed herein. Such add-ons may include a base plate whereon an aerodynamic device or noise reducing device is placed. Such devices include vortex generators, slats, flaps and/or spoilers. Either way, mounting such a device attached to a base plate on a wind turbine blade may also be follow be the edge treatment of the base plate at least at the edges facing the leading or trailing edge of the blade.

In the sealing step, a sealing agent/adhesive is used to form an edge seal on the edge step, with a small overlap. The sealing agent or the same may be of different properties (compared to the material of the edge step and/or the adhesive used to fix the add-on) but may also be of the same composition.

The extent of the sealing $\delta$ is tuned in order to reduce the aerodynamic impact of the step due to the interfacing surfaces based on wind tunnel measurements. The extent of the edge sealing $\delta$ is dependent on the edge step t at a junction J1 (i.e., the position of the edge step). The ratio of $\delta$ with respect to t can vary anywhere between 4:1, or 20:1, to 100:1. In absolute values, the edge step height is at least 0.25 mm, especially at least 0.5 mm and/or the edge seal width lies between 5 mm to 150 mm The edge sealing is tuned in order to prevent/delay the onset of flow transition from Laminar to turbulent on the surface of the blade due the edge step. The recommended ratios are longer than typically used by the solutions described in the state of the art. The edge sealing proposed above uses a sealing agent of a suitable viscosity to make the adhesive fluid enough to flow into the gaps and surface crevices formed due to the application and ensure a smooth finish. At the same time the viscosity of the adhesive drives the step at junction J2 (i.e., the point where the edge seal transitions into the rotor blade surface). The step height at junction J2 is of less than 100 μm. This can be achieved using the application process for the edge sealer e.g., as described below.

In an embodiment, after the sealing has cured, the top layer of the sealing is grinded away to expose the junction J1. The grinding may be done with any ordinary grinding tool (e.g., a random orbit sander), or even by hand, but with the help of a specialized edge grinding tool.

In theory, it is not necessary to have an overlapping edge sealing in order to accomplish the solution of embodiments of the invention. However, in practice, applying an edge seal without an overlap leaves an edge step of possibly varying height depending in the hardness (stiffness) of the add-on part and the pressure applied using the spreading spatula during application and finishing of the edge seal. This introduces an uncertainty in how high the resulting edge step is and how much effort will be required to remove it (e.g., grind it away). Also, depending on the add-on part, it may be difficult or even undesirable to grind a significant portion of the add on part surface. Having an overlapping sealing ensures that only the top layer of the sealing material needs to be removed until the overlap (nearly) disappears thereby establishing an easy and quantifiable way to ensure the optimum finish and avoid grinding significantly into the add-on part itself. Thus, the sealant is overlapping with the edge step of the add-on.

The solution can be applied to a blade prior to mounting the blade on a wind turbine or as a retrofit solution to blades already mounted to a hub of installed wind turbine.

One special feature of embodiments of the invention lies in the application of the grinding process, especially in a combination of the sealing and grinding process to produce an almost smooth surface finish. The combination of sealing and grinding is an innovation of embodiments of the presented invention. The combination helps reduce to the step height at J1 (the position of the edge step) to be less than 100 μm. Despite the fact that a grinding process is laborious, the inventors found out that it nevertheless bears important advantages concerning the integrity of the edge seal and quality of the transition between add-on and rotor blade surface.

Embodiments of the invention could make the LEP solution AEP neutral, which would offer a competitive advantage for this product in the market. It would also help reduce the AEP risk on new and existing turbines by reducing the AEP impact of the LEP solution. The solution could be applied in the factory and in field offering similar results irrespective of the application environment. In principle, embodiments of this invention could be used to avoid surface steps caused by any add-on/sensor on the blade surface thereby preserving the aerodynamic performance of the wind turbine.

A wind turbine rotor blade according to embodiments of the invention comprises at least one add-on part mounted to the outer surface of the rotor blade, and an edge seal formed with a method according to embodiments of the invention.

Particularly advantageous embodiments and features of the invention are given by the dependent claims, as revealed in the following description. Features of different claim categories may be combined as appropriate to give further embodiments not described herein.

According to a method, comprising a step of determining a width of an edge seal overlap in an overlap region adjacent to the longitudinal edge step of the add-on part, wherein the overlap width is determined on the basis of the height at the longitudinal edge step of the add-on part.

According to a method, the provision of the initial edge seal comprises the step of sealing a longitudinal edge step of an add-on part mounted on an outer surface of a rotor blade, wherein liquid sealant is applied at the edge on the surface of the rotor blade, overlapping with the add-on part. It is desired that the liquid sealant is spread using a preliminary shaping tool and then smoothed to its final shape by drawing a finishing tool over the spread sealant.

According to a method, providing an initial edge seal, comprising the steps:
　delimiting an application area on the rotor blade surface and the add-on part to be covered by sealant compound with a thin and smooth masking tape, with a thickness less than 0.2 mm,
　dispensing of the sealant on the application area, especially by a bead or spray application, wherein the sealant is applied in a serpentine line overlapping the transition between the add-on and the blade surface,
　distribution of the sealant, by using a flexible toothed spatula,
　(optional) smoothening the adhesive with a, flexible, tool moved in the longitudinal direction of the blade, wherein the tool is so designed to meet the profile of the blade,
　removing the masking tape,
　smoothening of a sealant transition step with a flexible tool, with a Shore A hardness between 40 and 60.

The method comprises use of the following tools by example:

A tooth spatula, of a flexible material, for levelling the sealing agent or adhesive sealant material after it has been dispensed to the sealed application area on the add-on.

A second spatula e.g., of a flexible material characterized by a Shore A hardness of 40-60, e.g., a silicone material, with a cross-section profile adapted to the application and a low energy surface (surface free energy) preventing adhesion of the sealing material. The angle between the soft spatula and the blade surface at the point of contact with the blade surface during use should be lower than in the case of a hard spatula.

Whether or not the sealant material is formed to overlap the add-on edge or step, the sealant material may be applied using a tool set comprising a number of spatulas with different properties. In an embodiment of the invention, the step of forming an edge seal comprises a step of depositing sealant material at least onto the surface of the rotor blade alongside the longitudinal edge of the add-on part. Then, a preliminary spatula is used to spread the sealant material in a region bounded by the longitudinal edge of the add-on part and the chosen edge seal width. The preliminary tool has a flexibility and shape that facilitates the initial spreading of the sealant.

In a subsequent step, a refining spatula is used to refine the shape of the sealant spread by the preliminary tool. In an embodiment, the refining tool has a lower hardness than the preliminary tool.

The inventive method can include a step of delimiting the area of the intended edge seal using smooth, thin masking tape. One tape may extend along the outer edge of the intended edge seal, at a distance outward from the edge step. This distance is at least 20 times larger than the edge step height. The thickness of the tape is as small as possible, at most 0.2 mm. The other boundary of the edge seal may be defined by the edge step. Alternatively, if an overlap is to be formed over the edge step, a second tape may be applied to the surface of the add-on, parallel to the longitudinal edge of the add-on. The sealant is then applied within these bounds. The sealant can initially be roughly deposited on the rotor blade (and add-on), for example in the form of a bead from a dispenser nozzle, or by spraying. The roughly applied sealant is then spread using a preliminary shaping tool, for example a flexible toothed spatula.

Thus, according to a method, the distribution of the sealant is achieved by using a toothed spatula, of a flexible material, for levelling the sealant after it has been dispensed to the application area, wherein the teeth of the toothed spatula have a distance between 1 to 2 mm and/or a height between 0.2 to 5 mm.

The spreading can be done by guiding the toothed spatula in the longitudinal direction of the rotor blade surface, between the edge seal bounds. After this preliminary step is complete, the tape or tapes are removed. The still-liquid sealant is then smoothed to its final shape by drawing a softer, flexible spatula over the spread sealant. This refining or smoothing step with the second tool serves to further decrease the height of the "wedge" of the edge seal between the edge step and the outer boundary of the edge seal. The second flexible spatula is made of a material such as silicone to ensure a relatively low Shore hardness, for example 50±10.

Thus, according to a method, the flexible tool is a second spatula, with a Shore A hardness between 30 and 70, especially between 40 and 60, especially between 48 and 52. A Shore A hardness is bigger than 30, particularly bigger than 40, especially more than 45 and/or a Shore A hardness is smaller than 70, particularly smaller than 60, especially less than 55.

The application process is designed to minimize and ideally prevent an AEP loss due to a step between blade surface and the attached and bonded cover/plate.

According to a method, removing of the top layer of the initial edge seal is done by machining, by grinding and/or sanding and/or cutting and/or milling. It is preferred that the resulting edge seal is flush with the edge step, i.e., there is no step between the add-on and the edge seal. This can be achieved by the removing-step.

According to a method, the angle between the surface of the resulting edge seal and the surface of the rotor blade is smaller at the point of the edge step as it is at the point where the edge seal transitions onto the rotor blade surface. This means that the surface of the edge seal compared with the surface of the rotor blade is steeper at the part of the edge seal opposite to the edge step.

One could say that the slope of the edge seal in the direction pointing away from the edge step is constant or increases with increasing distance from the edge step. Although the resulting edge seal may have a concave surface, it is desired that the resulting edge seal has the shape of a wedge with a convex surface and/or a kink in its surface, wherein a surface with a flat area adjoining the edge step is desired. Particularly it is desired that the edge seal has the nature of a cubic curve with the surface of the edge seal being convex near the edge step (higher surface) to the add-on part. Alternatively, or additionally, it is desired that the edge seal has a concave surface-area near the end of the sealing towards the rotor blade surface (lower surface). This embodiment is easy to produce without the danger of damaging the surface of the rotor blade during removing the top layer due to the special shape of the resulting edge seal.

A sealing agent (sealant) or an adhesive is used to form the edge seal along one or more edges (edge steps) of the add-on, either with or without an overlap as will be explained in the following. The geometry of the edge sealing is tuned and optimized in order to reduce the aerodynamic impact of the step due to the interfacing surfaces, i.e., a leading-edge solution. Thus, according to a method, a width of the sealing is tuned in order to reduce the aerodynamic impact of the step due to the interfacing surfaces based on wind tunnel measurements.

The terms "sealant", "edge sealer" and "sealing agent" may be used to refer to such an adhesive. In an embodiment, the adhesive used for fixing an add-on comprises the same material as the edge sealer or the other way around. The sealant can be an adhesive, however, this is not necessary in every case. In this application, the term "sealant" includes the term "adhesive".

In an embodiment, the seal is formed using a specific liquid sealant (especially an adhesive material) that solidifies sometime after application and which, when liquid, has a specific rheology, especially an adhesive viscosity, that offers a good balance between sag resistance and flowability. Rheological properties and a specific adhesive viscosity of a sealant is tailored to the particular geometry and position of the seal. On the one hand, the viscosity must be sufficiently low to allow the sealant/adhesive to spread easily and to run off any streaks that may occur during spreading. yet on the other hand, the yield point (sag resistance) of the sealant must be high enough to avoid a gravity-induced run-off of the sealant, which would adversely affect the contour of the seal created by the application process.

In an embodiment, the solidified sealant is (highly) flexible, abrasion-resistant, and adheres well to the surface to which it is applied and as well has a good resistance to UV-exposure.

In general, any liquid sealant/adhesive material solidifying after application either by a physical process, a chemical reaction or a combination of both is suitable for the purpose of embodiments of this invention. Reactive two component sealant is desired due to its faster cure response and the resulting faster process. In an embodiment, physically hardening sealants like a hot melt sealant that becomes firm upon cooling and/or sealants curing by a chemical reaction may be used. From the group of chemically curing sealants two-part sealants are desired due to their faster cure response and the resulting faster process.

It is desired to use a sealant with a solidification speed (open time) that allows on the one hand a sufficient time for the application process, i.e., dispensing, levelling and creation of the contour in accordance with embodiments of this invention. On the other hand, in the interest of short process times, further processing should be possible as quickly as possible. Here, in particular chemically crosslinking two-component adhesives offer advantages, especially since their cure can be accelerated by moderate heating, e.g., by IR emitters, after the contour according to embodiments of the invention has been formed, allowing a further process times reduction.

Exemplary materials may be epoxy, polyurethane, polyuria, silicone, silane modified polymers (SMP), methylmethacrylate (MMA) and hybrid solutions, chosen in view of the desired properties in the liquid and cured state, especially of sag resistance and flowability, as indicated above. For example, a sealant material may be chosen to have a specific adhesive viscosity offering a good balance between sag resistance and flowability, as well as a favorably high degree of flexibility in its cured state. The integrity of an edge seal formed along the longitudinal edges of an LEP using such a material will not suffer from repeated torsional bending of the rotor blade.

In an embodiment a two-component sealing material is used, where the two components are mixed immediately prior to the application of the sealing material on die surface of the blade, wherein the viscosity of the two components lie between 40.000-110.000 mPas for one component and between 100.000-380.000 mPas for the other component.

A desired sealant has a surface tension being lower than the surface free energy of the surfaces it is applied to in order to allow, as prerequisite for the formation of adhesion a sufficient wetting of such surfaces. An increase of the surface free energy by suitable methods, e.g., but not limited to cleaning, abrasion, application of a primer or adhesion promoter and activation methods, e.g., but not limited to plasma-, corona-, flame-, VUV (vacuum-ultraviolet) is explicitly part of embodiments of the invention. In addition to the above-mentioned ability to wet the surfaces a good adhesion of the adhesive and the surface of the blade and the respective add-ons is crucial to fulfil the demanding requirements regarding service life, especially under the harsh conditions of offshore installations.

In addition to good adhesion, the mechanical properties of the sealant are of great importance. Both a high abrasion resistance to withstand rain erosion conditions and a sufficient fatigue strength to withstand the vibrations of the blade during operation are required. Thus, a desired sealant has a sufficient resistance to the peeling forces occurring on the respective surfaces over the entire service life of the blade especially bigger than 2 N/mm. The test method for long-term resistance is the procedure described in ISO 20340.

Due to the wide range of possible applications of the sealing being subject of embodiments of the invention, with regard to the materials involved, the size of the respective add-ons and their position on the blade, the sealant is tailored to the respective application.

A sealant has a tensile strength (acc. DIN EN ISO 527) of bigger than 4 MPa and/or smaller than 8 MPa, particularly 5 MPa±a value<0.5 MPa, especially 5 MPa. After 1000 h at 80° C. the tensile strength may alter to about 9 MPa or bigger.

Alternatively, or additionally, the elongation at break (acc. DIN EN ISO 527) is bigger than 80% and/or smaller than 130%, particularly 90%±5%, especially 90%. After 1.000 h at 80° C. the elongation at break may alter to a value of 100% or bigger.

Alternatively, or additionally, the Young's Modulus (acc. DIN EN ISO 527) is bigger than 8 MPa and/or smaller than 150 MPa, particularly 11 MPa±a value<2 MPa, especially 11 MPa. After 1.000 h at 80° C. the Young's Modulus may have a value of 11 MPa or bigger.

The exposure to 80° C. for 1000 hours refers to an accelerated aging test to mimic higher blade surface temperature as a result of the sunlight during the turbine's lifetime. The maximum surface temperature under real life off-shore conditions is estimated as 60° C. In an embodiment, the sealant is chosen such that Young's modulus remains constant and/or such that tensile strength and/or elongation of break are increasing, wherein the combination of all three requirements is very advantageous for the long-term durability of the sealant.

Thus, according to a method, the sealant is fluid enough to flow into gaps and surface crevices formed during application of the add-on, and to ensure a smooth finish.

In an embodiment the sealant offers one or more of the following properties. The sealant has
- a surface tension being lower than the surface free energy of the blade surface and/or
- a sufficient resistance to the peeling forces occurring on the respective surfaces over the entire service life of the blade, especially bigger than 2 N/mm, and/or
- a tensile strength of bigger than 4 MPa and/or smaller than 8 MPa, and/or
- an elongation at break bigger than 80% and/or smaller than 130%, and/or
- a Young's Modulus bigger than 8 MPa and/or smaller than 150 MPa.

According to a method, before dispensing of the sealant on the application area a filler is first applied along the longitudinal add-on edge, wherein the filler is a quick-setting adhesive and/or a high-viscosity adhesive, and the sealant is applied over the cured or hardened filler.

According to a method, the sealant comprises the same material as an adhesive used for bonding the add-on on the rotor blade surface.

A desired sealing material has a good sandability, so that a smooth, aerodynamically advantageous surface can be produced. Therefore, the maximum size of solid particles (e.g., filler particles, agglomerates of filler particles, gel particles) in the sealing material both in its liquid as well as hardened or cross-linked state is limited to max. 200 µm, limited to max. 100 µm, particularly limited to max. 60 µm or even limited to max. 50 µm, especially determined according to DIN EN 21 524 or ISO 1524.

The inventive method of aerodynamically optimizing the edges of an add-on is not limited to aerodynamic devices such as LEP covers. The add-on may be a plate comprising sensors, e.g., a flexible plate, that conforms to the curved surface of the rotor blade. The fixation of such a sensor plate to the rotor blade surface benefits from the sealing concept of embodiments of the present invention, achieving improvements in respect of AEP. Such a plate may be attached to the rotor blade surface at any position between the leading edge and trailing edge of the rotor blade, and may be mounted on the suction side or the pressure side of the rotor blade.

In an embodiment, an edge seal is formed along the longitudinal edge of such a plate, using the inventive method. In this way, neither the upwind or windward edge (i.e., the edge that is closer to rotor blade leading edge) nor the downwind edge (the edge that is closer to the rotor blade trailing edge) of such a plate will adversely affect the laminar airflow over the rotor blade surface. So, embodiments of the invention are not limited to shells or aerodynamic devices but also includes any kind of sensors mounted on e.g., a base plate on the blade surface, e.g., a flexible plate. Thus, improvements in respect of AEP are also possible for plates like sensor plates as well as reducing noise generated when mounting such on a blade surface.

As an example, the edge step height (shell height) of an add-on may be anywhere between 0.25 mm to 2 mm, especially between 0.5 mm and 1.5 mm or between 0.7 to 1 mm. The edge step height of an add-on is the sum of the thickness at the outer edge of the add-on plus the thickness of any adhesive or bonding layer used to attach the add-on to the rotor blade.

A minimum width of the edge sealing is 5 mm, 20 mm, particularly 40 mm. A preferred maximum width of the edge sealing is 150 mm, 100 mm, particularly 60 mm. Especially it is desired that the width is chosen corresponding to the height of the respective edge step. For example, for an edge step height of 0.7 mm, the minimum width of the edge sealing could be 14 mm (minimum). For example, for an edge step height of 1.0 mm, the minimum width of the edge sealing could be 20 mm (minimum).

The ratio of edge seal width to step height can vary between 4:1 or 20:1 to 100:1. For the example edge step height range of 0.5 mm-1.5 mm, the edge seal would be at least 10 mm wide, and up to 150 mm wide. Such relatively wide edge seals for rotor blade add-on parts have been observed (in wind tunnel tests) to result in an improved aerodynamic behaviour. Thus, according to a method, the ratio of width and/or overlap width to height at the longitudinal edge step is bigger than 4:1 (or bigger than 20:1) and/or smaller than 100:1.

A further embodiment of the invention is based on the insight that the laminar nature of the airflow over the rotor blade surface can be preserved by forming the edge seal over the longitudinal edge of the add-on, i.e., by having the edge seal "overlap" the outer surfaces of both the add-on and the rotor blade. In a further embodiment of the invention, therefore, the method comprises a step of determining an overlap width for the edge seal, in a region of the add-on surface next to its longitudinal edge. The term "overlap width" shall be understood to mean the width of the edge seal portion that extends onto the surface of the add-on. The overlap width is determined on the basis of the add-on height.

The step of forming the edge seal then comprises applying the sealant material also onto an overlap region of the add-on part. The overlap of the edge seal can advantageously form a smooth layer over the edge of the add-on. Thus, according to a method, the sealant is formed to overlap the edge of the add-on.

In the inventive method, the edge seal width (and also the overlap width) for an edge seal are "tuned" to a specific add-on in order to prevent or at least significantly delay the onset of flow transition from laminar to turbulent on the surface of the blade behind the edge of the add-on, i.e., downwind of the add-on. In an embodiment, the extent (i.e., width) of the edge sealing and the extent of any overlap will be governed by the height of the edge step at the longitudinal edge of the add-on.

The ratio of overlap width to step height can vary from 10:1 to 50:1. For the example edge step height of 0.5 mm, the overlap width would be 5 mm-25 mm wide. For an edge step height of 1.5 mm, the edge seal width would be 15-75 mm wide. The recommended ratios described above are significantly larger than typically used by solutions known in the art. The maximum possible width or extent of an edge sealing may also be determined or limited by a curvature of the rotor blade.

The edge sealing proposed herein may be achieved by using a sealing agent (sealant) or adhesive with sufficiently low viscosity, to be fluid enough to flow into any gaps and surface crevices formed during application of the add-on, and to ensure a smooth finish. However, since the viscosity of the adhesive will determine the minimum height of the edge seal along its outer boundaries, the sealant material is also chosen such that a smooth transition to the blade surface is assured.

At the same time the viscosity of the adhesive drives the step in the simple edge sealing and in the overlapping edge sealing. The overlapping edge sealing may be able to eliminate a step by forming a smooth layer over the shell edge. The edge sealing material is chosen such that a smooth transition to the blade surface is assured.

For large edge steps, a filler material may be used to augment the edge seal. In such an embodiment of the invention, filler material is applied along the edge of the add-on to reduce the edge step initially, i.e., to form a compact wedge or slope extending outward from the add-on edge. The sealant material is then applied over the filler. The filler material may have a higher viscosity than the sealant material to facilitate an easy build-up of the filler or bottom layer to a finite thickness. The extent (width) of the filler is less than the width of the edge seal width in order to ensure that there is a uniform layer of edge sealer on the surface to enable a smooth edge at the end of the edge seal, i.e., a smooth transition to the rotor blade surface. The volume occupied by the filler material may be less than half the intended volume of the edge seal.

At a wind turbine rotor blade, an add-on part comprises any of a leading-edge protective cover, a trailing edge panel, a vortex generator panel, a slat, a plate or a sensor panel. Other possibilities are listed above.

At a wind turbine rotor blade, the thickness of the add-on part at its longitudinal edge is in the range of 0.2 mm to 5.0 mm, or 0.25 or 0.5 mm to 1.5 mm.

Advantageously, the inventive arrangement and method reduces the aerodynamic performance impact of steps or other obstacles on the surface of a blade (e.g., occurring from the application of LEP) by reducing/avoiding an edge step. The solution also enables the use of LEP shells or LEP covers with a higher edge thickness. This enables a significant opportunity for cost reduction for the shells as the requirement of a thin edge is the cost driving factor in the manufacturing of these shells. Avoiding thinner shell edges also reduces the risk of wrinkling during application which further contributes to reduction of non-conformance cost and improves aerodynamic performance.

The edge sealing method described above contributes to the aerodynamic performance improvement of the LEP solution. The Edge sealing indirectly enables the use of a shell with a thicker edge which contributes to the reduction of cost of the shell and non-conformance cost.

An overlap finish is created with a proper material to smoothen the transition to the blade surface.

An advantage of embodiments of this invention is that shrinking of the sealant during solidification is compensated by the post processing and a smooth transition between add-on and sealant can be realized. It should be noted that the overlap itself is disadvantageous, since it can cause disturbances in the laminar air flow if it detaches or loosens from the add-on surface.

Embodiments of the invention offer the advantages that it reduces the aerodynamic performance impact of steps on the surface of a blade (e.g., occurring from the application of LEP or any other aerodynamic device or noise reducing mean attached to a surface of the blade) by reducing/avoiding an edge step. The solution also enables the use of LEP shells with a higher edge thickness. This enables a significant opportunity for cost reduction for the shells as the requirement of a thin edge is the cost driving factor in the manufacturing of these shells. Avoiding thinner shell edges also reduces the risk of wrinkling during application which further contributes to reduction of non-conformance cost and improves aerodynamic performance.

BRIEF DESCRIPTION

Some of the embodiments will be described in detail, with references to the following Figures, wherein like designations denote like members, wherein:

FIG. 1 shows an embodiment of an edge seal applied to the longitudinal edge of a rotor blade add-on;

DETAILED DESCRIPTION

Figure 1:
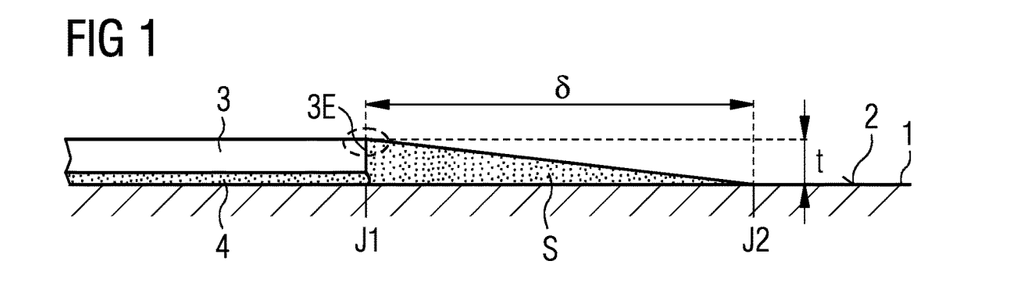

FIG. 1 shows an edge seal S applied to an add-on 3, which can be any of a LEP cover, a shell, a TE cover, a VG panel, a TE panel, a sensor panel, etc. The edge seal could be the result of a method according to embodiments of the invention. The add-on 3 is attached to the outer surface 2 of the rotor blade 1 by an adhesive bonding layer 4. For the purpose of discussion, the adhesive layer 4 may be regarded as an element of the add-on 3. The height t of the add-on 3 at its edge step 3E is the sum of the thickness of the add-on 3 and the thickness of the adhesive layer 4. The add-on edge step 3E may be assumed to run in a longitudinal direction of the rotor blade 1. The edge seal 3 may be assumed an idealized edge seal S, since there is no step between the edge step 3E of the add-on 3 and the edge seal S. The dashed ellipsis marks the edge step at point (junction) J1. one could see that the transition between the add-on and the edge seal S should be smooth.

The edge seal S commences at a first point J1 at the add-on edge step 3E and extends to a second point J2, whereby the height of the edge seal S gradually decreases from a maximum at point J1 to a minimum at point J2. The ratio $\delta:t$ is at least 20:1. The volume of the edge seal S in this case is the cross-sectional area of the edge seal S, i.e., $(t \cdot \delta)/2$, multiplied by the length of the seal S, e.g., the length of the longitudinal edge step 3E of the add-on 3.

Figure 2:
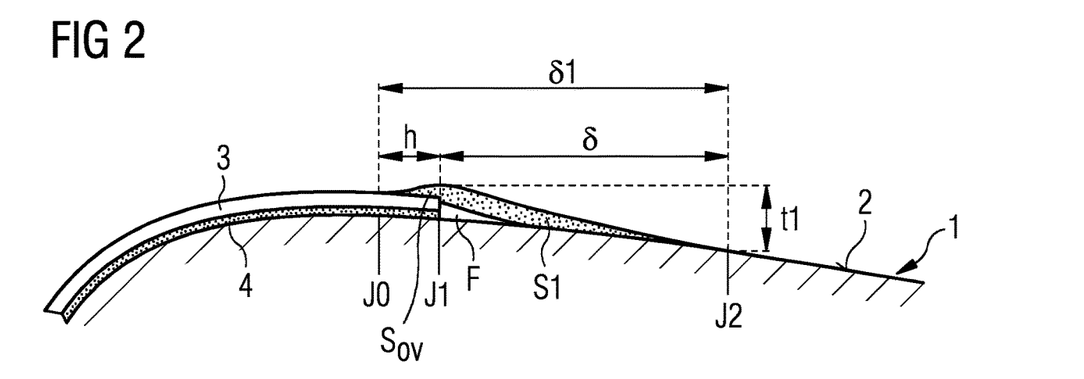
FIG. 2 shows an overlapping edge seal.

FIG. 2 shows a further embodiment of the inventive edge seal. Here, an initial edge seal S1 is applied to a longitudinal edge step 3E of an add-on 3, in this case an LEP cover mounted about the leading edge of a rotor blade 1. In this exemplary embodiment, the initial edge seal S1 overlaps the longitudinal edge step 3E of the add-on 3, i.e., the initial edge seal S1 commences at point J0 and extends to point J2. The total width $\delta 1$ of the initial edge seal S1 is therefore the width $\delta$ of the overlap $S_{OV}$ extending from point J0 to point J1, and the remaining edge seal width $\delta$ extending from point J1 to point J2. In this embodiment, the height t1 of the initial edge seal S1 gradually increases from a minimum at point J0 to a maximum at point J1, and gradually decreases from the maximum at point J1 to a minimum at point J2. The height t1 of the initial edge seal S1 at its maximum may exceed the height of the add-on edge step 3E by up to 2.0 mm, depending on the overlap width h and/or on the edge seal width $\delta$ between point J1 and point J2. This height t1 is based on the controlled layer thickness of the sealant or adhesive applied using a tool such as a spatula. In principle, it does not matter how much the height t1 of the initial edge seal S1 exceeds the height of the edge step, since the top layer of the edge seal will be removed.

The edge seal S in this case extends over a filler material F (herein also referred to as filler F) that is first applied along the longitudinal add-on edge 3E. The filler F may be a quick-setting adhesive and/or a high-viscosity adhesive. The filler F can be applied to form a wedge with straight sides that are shorter than the height of the add-on 3. In a subsequent step, sealant material is applied over the cured or hardened filler F. Thus, for large edge steps, the filler F may be used to reduce the edge step initially and the edge sealer can be applied subsequently. The filler material F may have a higher viscosity than the material of the edge seal S in order to enable an easy build-up of the bottom layer to a finite thickness. The extent of the filler F will be less than $\delta$ in order to ensure that there is a uniform layer of edge sealer on the surface to enable a smooth edge at Junction J2.

Figure 3:
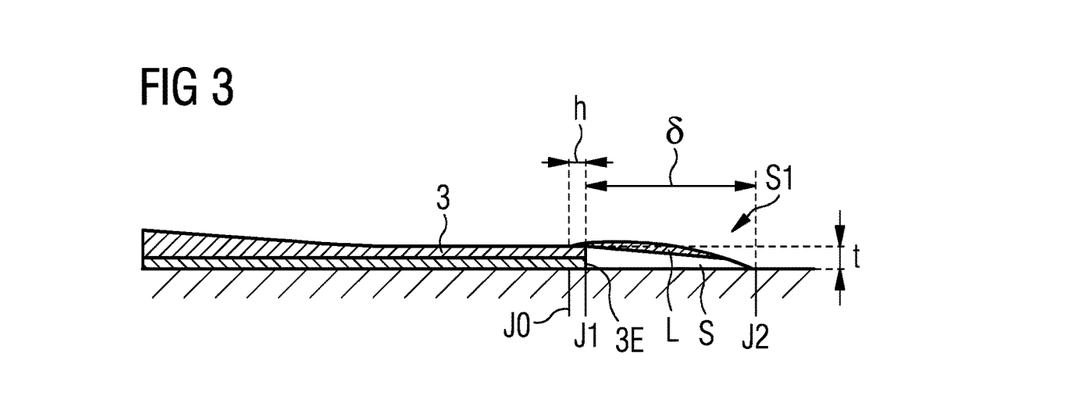
FIG. 3 shows an example for the shaping of an inventive edge seal.

FIG. 3 shows a further embodiment of the inventive edge seal S. First an initial edge seal S1 has been applied, e.g., similarly to the initial edge seal S1 of FIG. 2. In the sealing step, a sealing agent/adhesive is used to form an initial edge seal S1 on the edge step 3E of the add-on 3 with a small overlap. The sealing agent or the same may be of different properties but may also be of the same composition.

The width $\delta$ (or $\delta 1$) of the initial edge seal S1 is tuned in order to reduce the aerodynamic impact of the step due to the interfacing surfaces based on wind tunnel measurements. In an embodiment, the width $\delta$ is dependent on the height t of the edge step 3E at junction J1. The ratio of $\delta$ with respect to t can vary anywhere between 20:1 to 100:1.

When creating the initial edge seal S1, a sealing agent is applied on the blade 1 at the edge step 3E. It should have a suitable viscosity to allow the adhesive fluid of the sealing agent to flow into the gaps and surface crevices. At the same time the viscosity of the adhesive drives the step at junction J2. The step height at junction J2 is desirably of less than 100 µm. This can be achieved using an application process where the edge sealer is formed by an elastic spatula.

According to embodiments of the invention, the top layer L of the initial edge seal S1 (checked part) had been removed (or has to be removed) so that the remaining edge seal S is optimized. This can be achieved in that after the sealant has cured, the top layer L of the initial edge seal S1 is grinded away to expose the junction $J_1$. The grinding may be done with any ordinary grinding tool, such as a random orbit sander, or even by hand, but with the help of a specialized edge grinding tool. Alternatively, the top layer L can be milled, sanded or cut away.

There is (essentially) no step between the edge step 3E of the add-on 3 and the remaining edge seal S. Thus, the initial edge seal S1 is tuned to an optimized edge seal S in order to prevent the onset of flow transition from laminar to turbulent on the surface of the blade.

Figure 4:
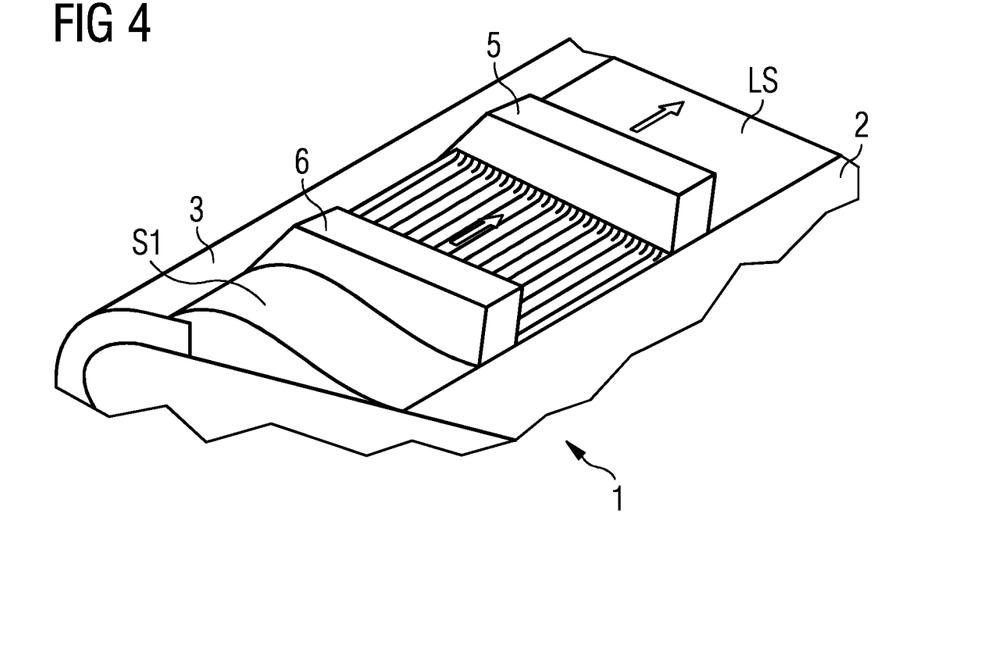
FIG. 4 shows a method for providing an overlapping edge seal.

FIG. 4 shows an add-on 3 attached to a rotor blade surface 2 and the forming of an initial edge seal S1 in a desired manner. The add-on 3 may be attached using an adhesive 4 as explained above (the adhesive not shown here). Liquid sealant LS is applied on the surface 2 of a blade 1 in the region of the edge step 3E of an add-on 3.

Prior to applying the sealant LS the area of the intended edge seal may be delimited by using smooth, thin masking tape (not shown). One tape may extend along the outer edge of the intended initial edge seal S1, at a distance outward from the edge step 3E. This distance is at least 4 times, or at least 20 times, larger than the edge step height. The thickness of the tape is as small as possible, or at most 0.2 mm. The other boundary of the initial edge seal S1 may be defined by the edge step 3E. Alternatively, if an overlap is to be formed over the edge step 3E, a second tape may be applied to the surface of the add-on 3, parallel to the longitudinal edge of the add-on 3. The sealant LS is then applied within these bounds. The sealant LS can initially be roughly deposited on the surface 2 of the rotor blade 1 and add-on 3, for example in the form of a bead from a dispenser nozzle, or by spraying.

The roughly applied sealant LS is then spread using a preliminary shaping tool, for example a flexible toothed spatula 5. This can be done by guiding the toothed spatula 5 in the longitudinal direction of the rotor blade surface 2, between the edge seal bounds.

After this preliminary step is complete, the tape or tapes are removed. The still-liquid sealant LS is then smoothed to its final shape by drawing a softer finishing tool, e.g., a flexible spatula 6, over the spread sealant LS. This refining or smoothing step with the second tool serves to further decrease the height of the "wedge" of the initial edge seal S1 between the edge step 3E and the outer boundary of the edge seal. The second flexible spatula 6 is made of a material such as silicone to ensure a relatively low Shore hardness, for example 50±10.

Figure 5:
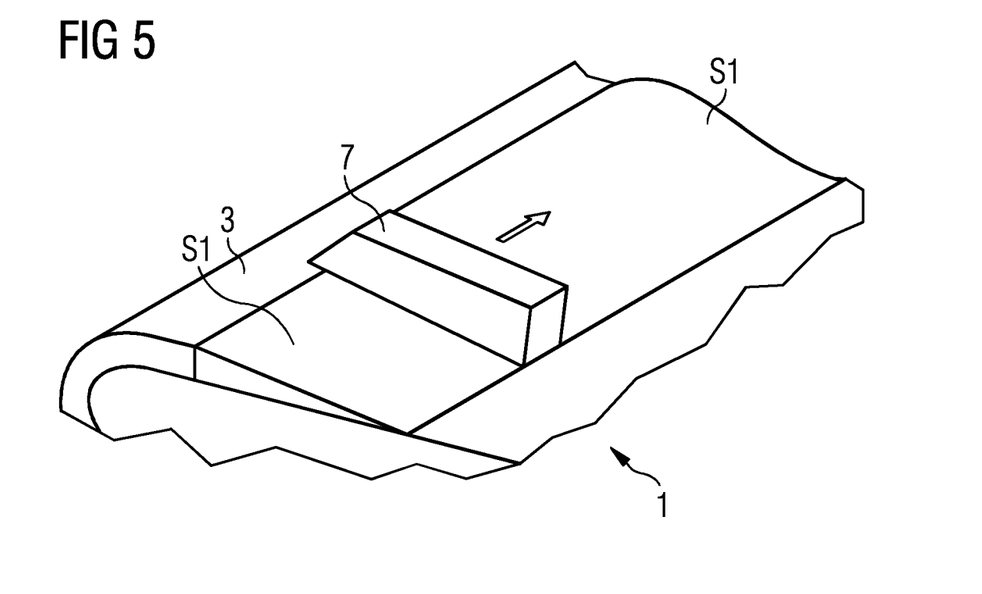
FIG. 5 shows a method according to embodiments of the invention.

FIG. 5 shows the initial edge seal S1 manufactured in FIG. 4 after curing. The initial edge seal S1 is treated by an abrasive tool 7 by removing the top layer L (see FIG. 3) from the hardened sealing material. The result is an optimized edge seal S as shown in FIG. 1.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of shaping an initial edge seal along a longitudinal edge step of an add-on part mounted on an outer surface of a rotor blade, which method comprises:
    providing the initial edge seal along the longitudinal edge step of the add-on part mounted on the outer surface of the rotor blade,
    removing a top layer of the initial edge seal.

2. The method according to claim 1, wherein the provision of the initial edge seal comprises the step of sealing the longitudinal edge step of the add-on part mounted on the outer surface of the rotor blade, wherein liquid sealant is applied.

3. The method according to claim 2, wherein a width of the initial edge seal is tuned in order to reduce the aerodynamic impact of the longitudinal edge step due to interfacing surfaces based on wind tunnel measurements.

4. The method according to claim 1, wherein the initial edge seal is overlapping with the add-on part.

5. The method according to claim 4, comprising a step of determining a width of an edge seal overlap in an overlap region adjacent to the longitudinal edge step of the add-on part, wherein an overlap width is determined on the basis of a height at the longitudinal edge step of the add-on part.

6. The method according to claim 5, wherein the ratio of width and/or overlap width to height at the longitudinal edge step is bigger than 4:1 and/or smaller than 100:1.

7. The method according to claim 1, comprising:
    providing the initial edge seal,
    delimiting an application area on the rotor blade surface and the add-on part to be covered by sealant compound with a thin and smooth masking tape,
    dispensing of the sealant compound on the application area, wherein the sealant compound is applied in a serpentine line overlapping a transition between the add-on and the blade surface,
    distributing the sealant compound, by using a flexible toothed spatula, or smoothening the sealant compound with a, flexible, tool moved in the longitudinal direction of the blade, wherein the tool is so configured to meet the profile of the blade, removing the masking tape, and
    smoothening of a sealant transition step with a flexible tool, with a Shore A hardness between 40 and 60.

8. The method according to claim 7, wherein the sealant compound has a maximum size of solid particles, filler particles, agglomerates of filler particles or gel particles in the sealant compound both in its liquid as well as hardened or cross-linked state, that is limited to max. 200 µm, or limited to max. 60 µm.

9. The method according to claim 7, wherein before dispensing of the sealant compound on the application area a filler is first applied along the longitudinal add-on edge, wherein the filler is a quick-setting adhesive and/or a high-viscosity adhesive, and the sealant compound is applied over the cured or hardened filler.

10. The method according to claim 7, wherein the sealant compound comprises the same material as an adhesive used for fixing the add-on on the rotor blade surface.

11. The method according to claim 1, wherein removing a top layer of the initial edge seal is done by machining, by grinding and/or sanding and/or cutting and/or milling, so that the resulting edge seal is flush with the edge step.

12. The method according to claim 1, wherein an angle between a surface of a resulting edge seal and a surface of the rotor blade is smaller at a point of the edge step as it is at a point where the resulting edge seal transitions into the rotor blade surface, wherein the resulting edge seal has a shape of a wedge with a convex surface or a kink in its surface.

13. A wind turbine rotor blade comprising at least one add-on part mounted to an outer surface of a rotor blade and an edge seal shaped by providing an initial edge seal along a longitudinal edge step of the at least one add-on part mounted on the outer surface of the rotor blade, and removing a top layer of the initial edge seal.

14. The wind turbine rotor blade according to claim 13, wherein the at least one add-on part comprises any of a leading-edge protective cover, a trailing edge panel, a base plate, a vortex generator panel, a slat, a plate, a spoiler, flaps and/or a sensor panel.

15. The wind turbine rotor blade according to claim 13, wherein a thickness of the at least one add-on part at its longitudinal edge step is in the range 0.2 mm to 5 mm, or 0.25-2 mm.

* * * * *